United States Patent Office.

IMPROVED PROCESS OF RENDERING AND BLEACHING TALLOW, LARD, &c.

JOHN S. SHAPTER, OF NEW YORK, N. Y.

Letters Patent No. 60,575, dated December 18, 1866.

*The Schedule referred to in these Letters Patent and making part of the same.*

TO ALL WHOM IT MAY CONCERN:

Be it known that I, JOHN S. SHAPTER, of the city, county, and State of New York, have invented a new and useful improvement in the Process of Rendering and Bleaching Tallow and other Fatty Matters; and I do hereby declare that the following is a full, clear, and exact description of the same.

This invention consists in the bleaching of tallow and other fatty matters by subjecting them, after rendering, to the action of a weak alkaline lye while heated *in vacuo*.

The process is conducted in an ordinary vacuum-pan, such as is used for evaporating saccharine juices, furnished with a condenser and air-pumps for the purpose of condensing and drawing off the aqueous and other evaporable and volatile matters. The rough fat may either be fed into the vacuum-pan in lumps through a man-hole, or be first melted and run in through a pipe, and is then heated to a temperature of from 200° to 300° Fahrenheit, and boiled at such temperature with the condenser and air-pumps in operation for from half an hour to one hour, or until all the noxious vapors and gases have been eliminated by the heat and drawn off by the air-pumps, and the tallow or fatty matters are found to be perfectly sweet by trying them with a test-stick, such as is used for trying sugar and other substances boiled *in vacuo*. The tallow or fatty matter, when boiled till sweet in this manner, will be of a yellow color, and then for the purpose of bleaching it I introduce, according to my invention, by a suitable pipe, a suitable quantity of alkaline lye, of a specific gravity of about seventy degrees, by Beaume's hydrometer, and boil, with the air-pumps and condenser at work, for about half an hour, or until the contents of the pan are found by the test-stick to have been perfectly bleached, when the process is complete, and the contents of the pan may be drawn off into any suitable receptacle. The alkaline lye used for the bleaching may be made with soda or potash, and the quantity requisite will not require it to be more than about one pint for every thirty pounds of tallow, so that the smallness of the quantity of alkali used, the lye being very weak, will not impair the quality of the tallow or fatty matter. By this process of rendering and bleaching with alkali *in vacuo*, I have obtained from fat, in so high a stage of decomposition as to be absolutely stinking, tallow of the whitest quality, comparing favorably in sweetness with the finest samples to be found in the market.

What I claim as my invention, and desire to secure by Letters Patent, is—

The bleaching of tallow and other fatty matters by subjecting them to the action of alkaline lye while heated *in vacuo*, substantially as herein specified.

JOHN S. SHAPTER.

Witnesses:
HENRY T. BROWN,
A. LE CLERC.